(12) United States Patent
Zhou et al.

(10) Patent No.: US 11,906,726 B2
(45) Date of Patent: Feb. 20, 2024

(54) MICROMACHINED MIRROR ASSEMBLY HAVING MICRO MIRROR ARRAY AND HYBRID DRIVING METHOD THEREOF

(71) Applicant: BEIJING VOYAGER TECHNOLOGY CO., LTD., Beijing (CN)

(72) Inventors: Qin Zhou, Mountain View, CA (US); Youmin Wang, Berkeley, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 148 days.

(21) Appl. No.: 17/464,401

(22) Filed: Sep. 1, 2021

(65) Prior Publication Data
US 2021/0396991 A1    Dec. 23, 2021

Related U.S. Application Data

(63) Continuation of application No. 16/224,754, filed on Dec. 18, 2018, now Pat. No. 11,181,734.

(51) Int. Cl.
*G02B 26/08* (2006.01)
*G01S 7/481* (2006.01)
*G02B 26/10* (2006.01)

(52) U.S. Cl.
CPC ........ *G02B 26/0833* (2013.01); *G01S 7/4817* (2013.01); *G02B 26/101* (2013.01)

(58) Field of Classification Search
CPC .. G02B 26/0833; G02B 26/101; G01S 7/4817
See application file for complete search history.

(56) References Cited

U.S. PATENT DOCUMENTS

| | | | |
|---|---|---|---|
| 9,703,096 B2 | 7/2017 | Shpunt et al. |
| 2004/0212864 A1 | 10/2004 | Greywall et al. |
| 2006/0039059 A1 | 2/2006 | Ji et al. |
| 2016/0238834 A1 | 8/2016 | Erlich et al. |
| 2017/0090184 A1 | 3/2017 | Shpunt et al. |
| 2017/0153319 A1 | 6/2017 | Villenueve et al. |
| 2017/0155225 A1 | 6/2017 | Villeneuve et al. |

FOREIGN PATENT DOCUMENTS

| | | |
|---|---|---|
| CN | 104221058 A | 12/2014 |
| CN | 104520750 A | 4/2015 |
| CN | 106415361 A | 2/2017 |

(Continued)

OTHER PUBLICATIONS

Office action issued in corresponding Chinese Application No. 201880098547.6, dated May 16, 2022, 8 pages.

(Continued)

*Primary Examiner* — Euncha P Cherry
(74) *Attorney, Agent, or Firm* — BAYES PLLC (57) ABSTRACT

Embodiments of the disclosure provide micromachined mirror assemblies and hybrid driving methods thereof. In one example, a micromachined mirror assembly includes a base and an array of micro mirrors affixed on the base. The base is configured to tilt around a base tilting axis. Each micro mirror in the array of micro mirrors is configured to tilt around a respective mirror tilting axis. Each of the mirror tilting axes is parallel to one another and is nonparallel to the base tilting axis.

20 Claims, 8 Drawing Sheets

(56) References Cited

FOREIGN PATENT DOCUMENTS

CN 107219532 A 9/2017
CN 107250876 A 10/2017

OTHER PUBLICATIONS

International Search Report issued in corresponding International Application No. PCT/US2018/067566, dated Mar. 29, 2019, 4 pages.
Written Opinion of the International Searching Authority issued in corresponding International Application No. PCT/US2018/067566, dated Mar. 29, 2019, 5 pages.

Drive a base of a micromachined mirror assembly to tilt around a base tilting axis
S802

Drive each micro mirror in an array of micro mirrors to tilt around a respective mirror tilting axis
S804

FIG. 8

MICROMACHINED MIRROR ASSEMBLY HAVING MICRO MIRROR ARRAY AND HYBRID DRIVING METHOD THEREOF

CROSS-REFERENCES TO RELATED APPLICATIONS

This application is a continuation of U.S. patent application Ser. No. 16/224,754, filed on Dec. 18, 2018, entitled "MICROMACHINED MIRROR ASSEMBLY HAVING MICRO MIRROR ARRAY AND HYBRID DRIVING METHOD THEREOF," which is hereby incorporated by reference in its entirety.

TECHNICAL FIELD

The present disclosure relates to micromachined mirror assemblies and driving methods thereof, and more particularly to, micromachined mirror assemblies and driving methods thereof used in a scanner for light detection and ranging (LiDAR).

BACKGROUND

LiDAR systems have been widely used in autonomous driving and producing high-definition maps. For example, LiDAR systems measure distance to a target by illuminating the target with pulsed laser light and measuring the reflected pulses with a sensor. Differences in laser return times and wavelengths can then be used to make digital three-dimensional (3-D) representations of the target. The laser light used for LiDAR scan may be ultraviolet, visible, or near infrared. Because using a narrow laser beam as the incident light from the scanner can map physical features with very high resolution, a LiDAR system is particularly suitable for applications such as high-definition map surveys.

The scanner of a LiDAR system includes a mirror that can be moved (e.g., tilted) by an actuator to reflect (and steer) incident laser beams from a laser source towards a predetermined angle. The mirror can be a single micromachined mirror assembly, or an array of micromachined mirror assemblies, made by semiconductor materials using microelectromechanical system (MEMS) technologies. A micro mirror array has been proposed to be used in LiDAR scanners because it can increase the total effective aperture. One the other hand, LiDAR systems require the laser scanning to be performed in two dimensions (e.g., in x and y scanning axes). However, mechanical interference prevents the micro mirrors in the array to be coupled and synchronized in two scanning axes.

Embodiments of the disclosure address the above problems by an improved micromachined mirror assembly and driving method thereof that can be used in a LiDAR scanner.

SUMMARY

Embodiments of the disclosure provide a micromachined mirror assembly. The micromachined mirror assembly includes a base and an array of micro mirrors affixed on the base. The base is configured to tilt around a base tilting axis. Each micro mirror in the array of micro mirrors is configured to tilt around a respective mirror tilting axis. Each of the mirror tilting axes is parallel to one another and is nonparallel to the base tilting axis.

Embodiments of the disclosure also provide a scanner for LiDAR. The scanner includes a first actuator, a second actuator different from the first actuator, and a micromachined mirror assembly. The micromachined mirror assembly includes a base and an array of micro mirrors affixed on the base. The base is configured to tilt around a base tilting axis driven by the first actuator. Each micro mirror in the array of micro mirrors is configured to tilt around a respective mirror tilting axis driven by the second actuator. Each of the mirror tilting axes is parallel to one another and is nonparallel to the base tilting axis.

Embodiments of the disclosure further provide a method for driving a micromachined mirror assembly including a base and an array of micro mirrors affixed on the base. The method includes driving the base to tilt around a base tilting axis. The method also includes driving each micro mirror in the array of micro mirrors to tilt around a respective mirror tilting axis. Each of the mirror tilting axes is parallel to one another and is nonparallel to the base tilting axis. The tilting of each micro mirror in the array of micro mirrors around the respective mirror tilting axis is synchronized.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
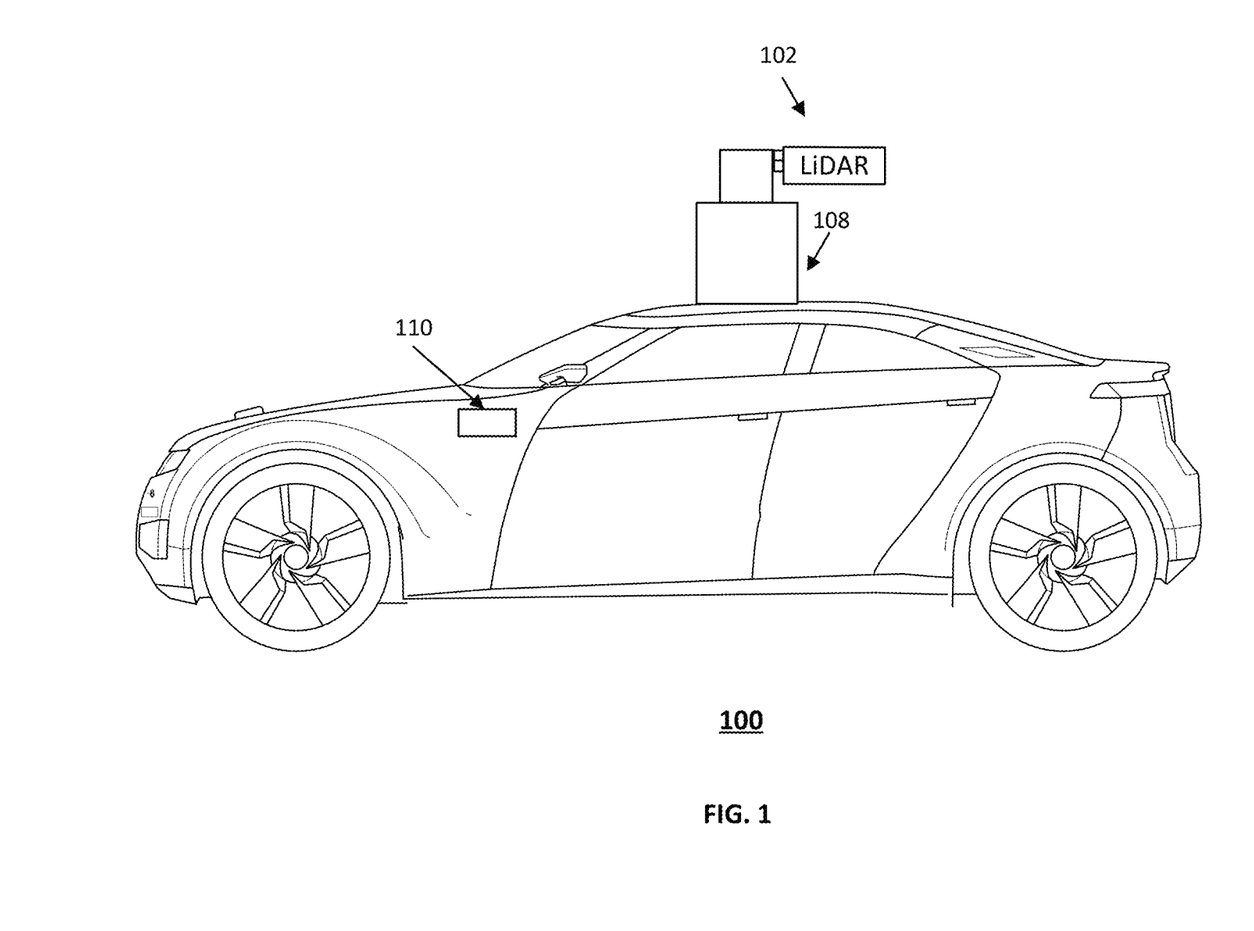
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring data for constructing a high-definition map or 3-D buildings and city modeling.

As illustrated in FIG. 1, vehicle 100 may be equipped with LiDAR system 102 mounted to body 104 via a mounting structure 108. Mounting structure 108 may be an electromechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3-D sensing performance.

Consistent with some embodiments, LiDAR system 102 and sensor 110 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser beam and measuring the reflected pulses with a receiver. The laser beam used for LiDAR system 102 may be ultraviolet, visible, or near infrared. In some embodiments of the present disclosure, LiDAR system 102 may capture point clouds. As vehicle 100 moves along the trajectory, LiDAR system 102 may continuously capture data. Each set of scene data captured at a certain time range is known as a data frame.

Figure 2:
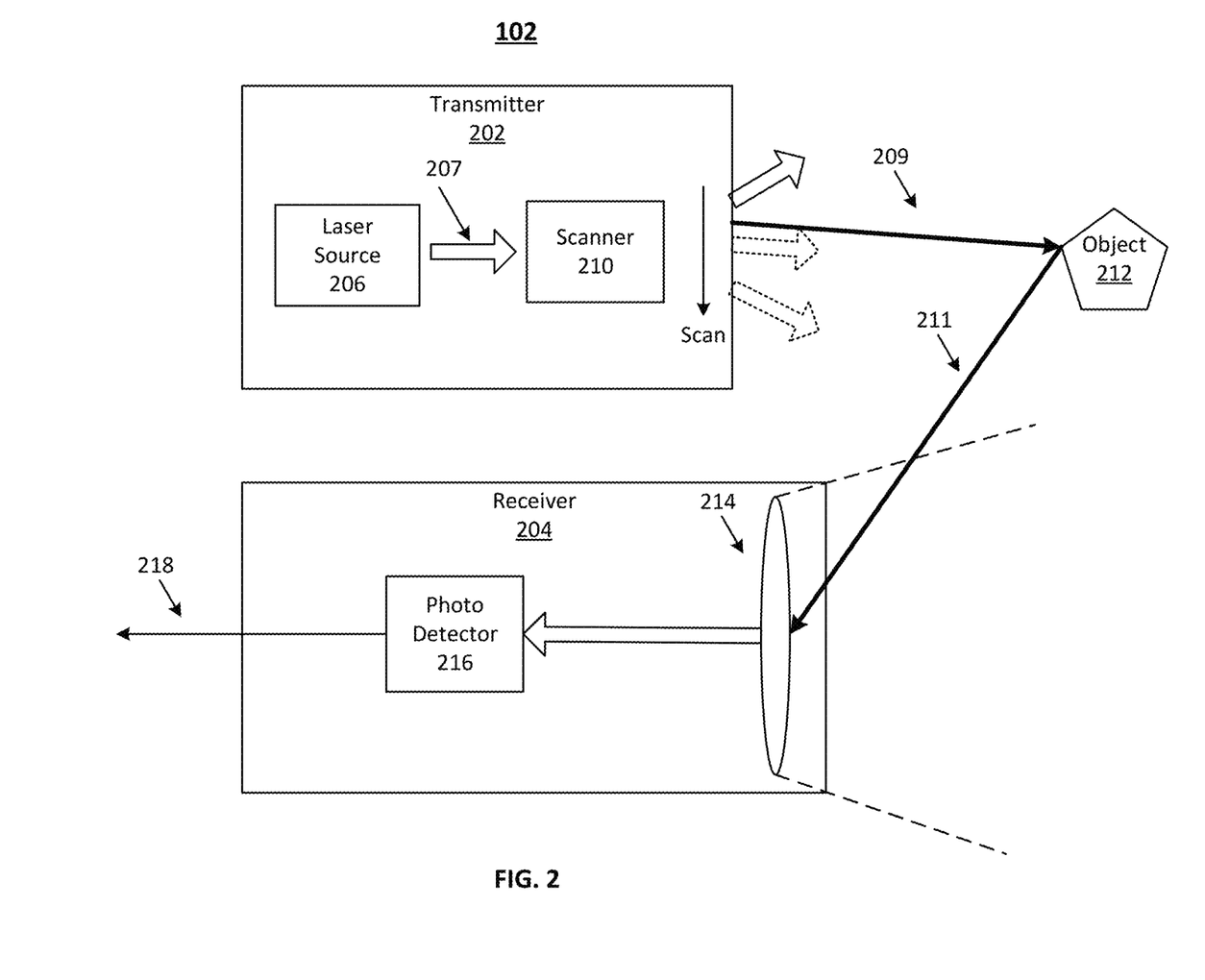
FIG. 2 illustrates a block diagram of an exemplary LiDAR system having a transmitter with a scanner, according to embodiments of the disclosure.

FIG. 2 illustrates a block diagram of an exemplary LiDAR system 102 having a transmitter 202 with a scanner 210, according to embodiments of the disclosure. LiDAR system 102 may include transmitter 202 and a receiver 204. Transmitter 202 may emit laser beams within a scan angle. Transmitter 202 may include one or more laser sources 206 and a scanner 210. As described in detail below, scanner 210 may include a micromachined mirror assembly (not shown) having a micro mirror array that can be driven in a hybrid manner in two dimensions. In some embodiments, each micro mirror is configured to tilt around a first tilting axis by a first driving mechanism (e.g., electrostatic or piezoelectric driving) in a synchronized manner, and the entire micro mirror array is configured to tilt around a second tilting axis (e.g., orthogonal to the first tilting axis) as a base of the micromachined mirror assembly tilts by a second driving mechanism (electromagnetic or thermal driving). A hybrid driving method can be used to drive the micromachined mirror assembly where one direction is a mechanically-coupled array structure, while in the other direction the micromachined mirror assembly is driven as an entire body. It is understood that although micromachined mirror assemblies and hybrid driving methods thereof disclosed herein are described in the context of a LiDAR scanner, their applications are not limited to the LiDAR scanner but can include any suitable optical systems that require driving a micro mirror array in at least two directions.

As part of LiDAR system 102, transmitter 202 can sequentially emit a stream of pulsed laser beams in different directions within its scan angle, as illustrated in FIG. 2. Laser source 206 may be configured to provide a laser beam 207 (referred to herein as a "native laser beam") in a respective incident direction to scanner 210. In some embodiments of the present disclosure, laser source 206 may generate a pulsed laser beam in the ultraviolet, visible, or near infrared wavelength range.

In some embodiments of the present disclosure, laser source 206 is a pulsed laser diode (PLD). A PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 207 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, or 848 nm.

Scanner 210 may be configured to emit a laser beam 209 to an object 212 in a first direction. Object 212 may be made of a wide range of materials including, for example, non-metallic objects, rocks, rain, chemical compounds, aerosols, clouds and even single molecules. The wavelength of laser beam 209 emitted may very based on the composition of object 212. At each time point during the scan, scanner 210 may emit laser beam 209 to object 212 in a direction within the scan angle by tilting the micromachined mirror assembly as the incident angle of incident laser beam 207 may be fixed. In some embodiments of the present disclosure, scanner 210 may also include optical components (e.g., lenses, mirrors) that can focus pulsed laser light into a narrow laser beam to increase the scan resolution and range of object 212.

As part of LiDAR system 102, receiver 204 may be configured to detect a returned laser beam 211 returned from object 212 in a different direction. Receiver 204 can collect laser beams returned from object 212 and output electrical signal reflecting the intensity of the returned laser beams. Upon contact, laser light can be reflected by object 212 via backscattering, such as Rayleigh scattering, Mie scattering, Raman scattering, and fluorescence. As illustrated in FIG. 2, receiver 204 may include a lens 214 and a photodetector 216. Lens 214 be configured to collect light from a respective direction in its field of view (FOV). At each time point during the scan, returned laser beam 211 may be collected by lens 214. Returned laser beam 211 may be returned from object 212 and have the same wavelength as laser beam 209.

Photodetector 216 may be configured to detect returned laser beam 211 returned from object 212. Photodetector 216 may convert the laser light (e.g., returned laser beam 211) collected by lens 214 into an electrical signal 218 (e.g., a current or a voltage signal). The current is generated when photons are absorbed in the photodiode. In some embodiments of the present disclosure, photodetector 216 may include avalanche photodiode (APD), such as a single photon avalanche diode (SPAD), a SPAD array, or a silicon photo multiplier (SiPM).

Although scanner 210 is described as part of transmitter 202, it is understood that in some embodiments, scanner 210 can be part of receiver 204, e.g., before photodetector 216 in the light path. The inclusion of scanner 210 in receiver can ensure photodetector 216 to only capture light, e.g., returned laser beam 211 from desired directions, thereby avoiding the interference from other light sources, such as the sun and/or other LiDAR systems. By increasing the aperture of mirror assembly in scanner 210 in receiver 204, the sensitivity of photodetector 216 can be increased as well.

Figure 3:
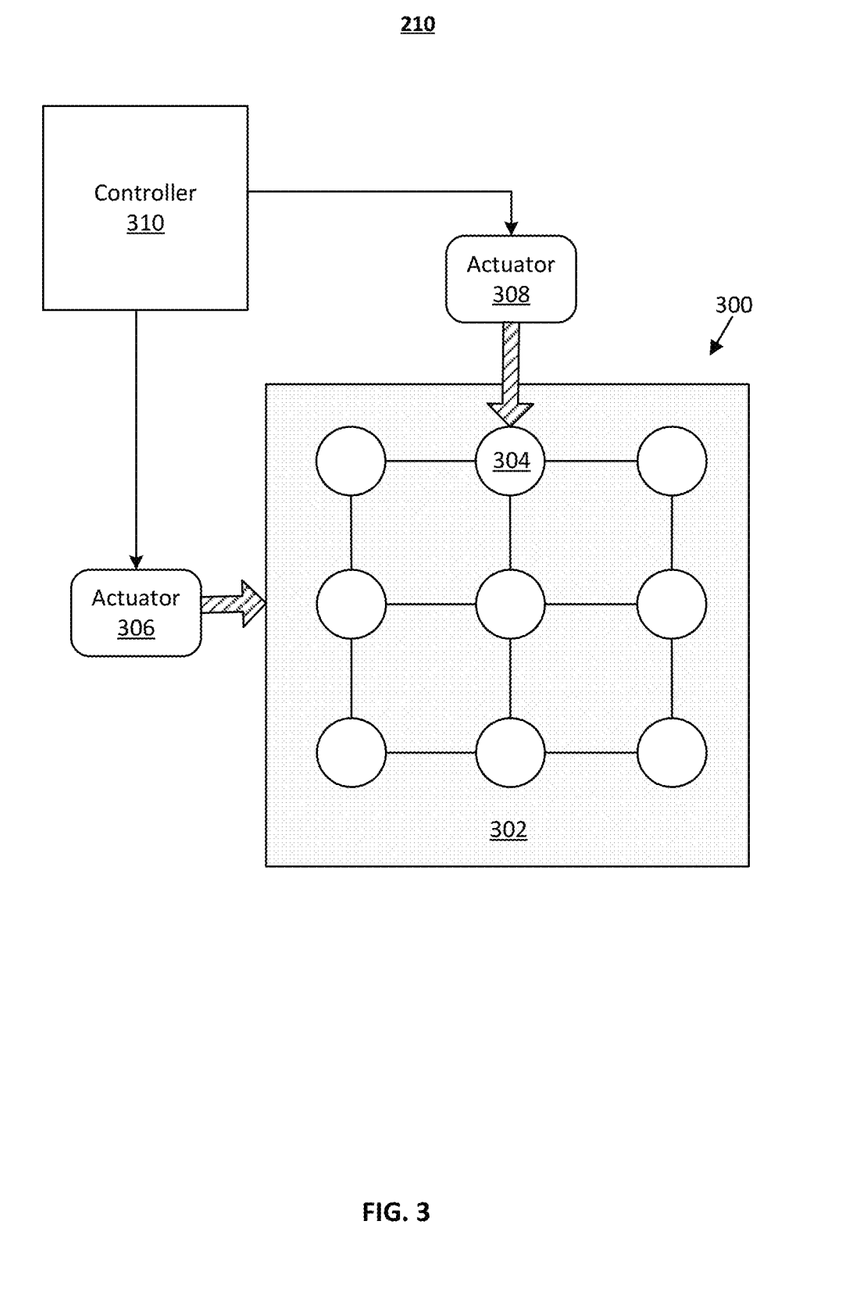
FIG. 3 illustrates a schematic diagram of an exemplary scanner of a LiDAR system having a micromachined mirror assembly, according to embodiments of the disclosure.

As described above, the incident angle of incident laser beam 207 may be fixed relative to scanner 210, and the scanning of laser beam 209 may be achieved by rotating a micromachined mirror assembly in scanner 210. FIG. 3 illustrates a schematic diagram of exemplary scanner 210 of a LiDAR system having a micromachined mirror assembly 300, according to embodiments of the disclosure. Scanner 210 may further include a first actuator 306, a second actuator 308, and a controller 310. Micromachined mirror assembly 300 may include a base 302 and an array of micro mirrors 304 affixed on base 302. In some embodiments, array of micro mirrors 304 and base 302 are made of semiconductor materials, such as silicon, which may not be reflective to an incident laser beam. Thus, each micro mirror 304 may be covered by a reflective layer (not shown) disposed on its top surface (facing incident laser beam). The reflective layer may be reflective to an incident laser beam, which is reflected by micromachined mirror assembly 300 to form a reflected laser beam. By tilting array of micro mirrors 304, the incident laser beam may be reflected to a different direction, i.e., to form another reflected laser beam. Base may be a rigid micromachined structure in any suitable shape on which array of micro mirrors 304 can be affixed. In some embodiments, micro mirrors 304 and base 302 are fabricated on the same wafer/substrate. In some embodiments, micro mirrors 304 and base 302 are separately fabricated on different wafers/substrates and stacked together, by bonding, adhesive, soldering, or any other suitable approaches.

Tilting mirrors can find applications in numerous optical systems. In many cases, the optical aperture of the system is determined by the mirror size. Larger optical aperture is preferred in various scenarios. Ideally, this can be achieved through increasing mirror sizes. However, this can sacrifice other performances, such as the speed that the mirrors are operating at. An alternative approach is to use mirror arrays, where the size of individual mirrors is not changed, but an array of identical micro mirrors is operated at the same time to increase the total effective aperture. However, each individual micro mirror in the array needs to be synchronized so at any instant of time, all the micro mirrors are tilted to the same direction. In an ideal system where every mirror is identical, this is achieved as long as the driving signal applied to each micro mirror is identical. However, due to variations in the manufacturing process, the same driving signal applied to each micro mirror will result in slightly different responses.

To solve this problem, as shown in FIG. 3, array of micro mirrors 304 are mechanically coupled such that their movements (e.g., tilting around a respective mirror tilting axis) are synchronized. It is understood that in some embodiments, array of micro mirrors 304 may not be mechanically coupled in order to be synchronized. For example, controller 310 can send the same control signal to drive each micro mirror 304 that is identical to one another (e.g., having the same material, dimensions, and shape). In some embodiments, array of micro mirrors 304 may not even be synchronized, and each micro mirror 304 can tilt individually. As micromachined mirror assembly 300 needs to tilt around at least two different axes in order to reflect light (e.g., laser beams) in two or three dimensions, array of micro mirrors 304 are affixed on base 302, which can tilt around a base tilting axis different from the mirror tilting axes, according to some embodiments. As a result, array of micro mirrors 304 can also tilt around the base tilting axis collectively with base 302.

In some embodiments, each individual micro mirror 304 has its own mirror tilting axis, and each the mirror tilting axis is parallel to one another. As array of micro mirrors 304 are mechanically-coupled, and the tilting of each micro mirror 304 around the respective mirror tilting axis may be synchronized when each micro mirror 304 has the same dimension and shape, according to some embodiments. On the other hand, there may be only one base tilting axis around which base 302 tilts. The base tilting axis may be unparallel to the mirror tilting axes. In some embodiments, the base tilting axis and the mirror tilting axes are orthogonal to one another.

In some embodiments, first actuator 306 is configured to drive base 302 to tilt around the base tilting axis by a first driving mechanism, and a second actuator 308 is configured to drive each micro mirror 304 to tilt around the respective mirror tilting axis by a second driving mechanism different from the first driving mechanism. That is, in one direction, array of micro mirrors 304 are mechanically-coupled and operated in synchronization under one driving mechanism, and each micro mirror 304's mirror tilting axis is separate and parallel, while in another direction, the whole array of micro mirrors 304 tilts together as base 302 tilts around a single base tilting axis under another driving mechanism. Accordingly, the driving method of micromachined mirror assembly 300 can thus be referred to herein as a "hybrid driving" method.

One reason behind using the hybrid driving method is that each axis can be operated at different frequencies in scanning applications, for example, in scanner 210 of a LiDAR system. In some embodiments, first actuator 306 is configured to drive base 302 to tilt at a frequency between 1 Hz and 100 Hz (e.g., 1 Hz, 2 Hz, 3 Hz, 4 Hz, 5 Hz, 6 Hz, 7 Hz, 8 Hz, 9 Hz, 10 Hz, 20 Hz, 30 Hz, 40 Hz, 50 Hz, 60 Hz, 70 Hz, 80 Hz, 90 Hz, 100 Hz, any range bounded by the lower end by any of these values, or in any range defined by any two of these values). In one example, the frequency at which base 302 tilts is 10 Hz. In some embodiments, second actuator 308 is configured to drive each micro mirror 304 to tilt at a frequency between 100 Hz and 100 KHz (e.g., 100 Hz, 200 Hz, 300 Hz, 400 Hz, 500 Hz, 1 KHz, 2 KHz, 3 KHz, 4 KHz, 5 KHz, 6 KHz, 7 KHz, 8 KHz, 9 KHz, 10 KHz, 15 KHz, 20 KHz, 30 KHz, 40 KHz, 50 KHz, 60 KHz, 70 KHz, 80 KHz, 90 KHz, 100 KHz, any range bounded by the lower end by any of these values, or in any range defined by any two of these values). In one example, the frequency at which each micro mirror 304 tilts is 10 KHz.

The difference of tilting frequencies around different tilting axes (e.g., as described above) causes a difference in the driving requirements in different directions. In some embodiments, the mirror tilting axis is the fast axis because each micro mirror 304 has a relatively smaller size compared with base 302 and their rotational moment of inertia is also smaller than that of base 302. As a result, second actuator 308 may be an electrostatic actuator or a piezoelectric actuator that drives each micro mirror 304 by electrostatic driving or piezoelectric driving, respectively. It is understood that second actuator 308 can be any other actuators (with corresponding driving mechanisms) that are suitable for high frequency but low rotational moment of inertia driving. In contrast, the base tilting axis is the slow axis operated at a lower frequency with a higher rotational moment of inertia due to the relatively larger size of base 302. As a result, first actuator 306 may be an electromagnetic actuator or a thermal actuator that drives base 302 (and the entire array of micro mirrors 304) by electromagnetic driving or thermal driving, respectively. It is understood that first actuator 306 can be any other actuators (with corresponding driving mechanisms) that are suitable for low frequency but high rotational moment of inertia driving.

In some embodiments, controller 310 may have different modules in a single device, such as an integrated circuit (IC) chip (implemented as an application-specific integrated circuit (ASIC) or a field-programmable gate array (FPGA)), or separate devices with dedicated functions. Controller 310 may be part of scanner 210 as shown in FIG. 3, or a separate component from scanner 210. Controller 310 may be configured to send driving signals to first and second actuators 306 and 308 to control the operations of base 302 and array of micro mirrors 304, such as the tilting frequencies and rotational moments of inertia, as described above in detail.

Figure 4:
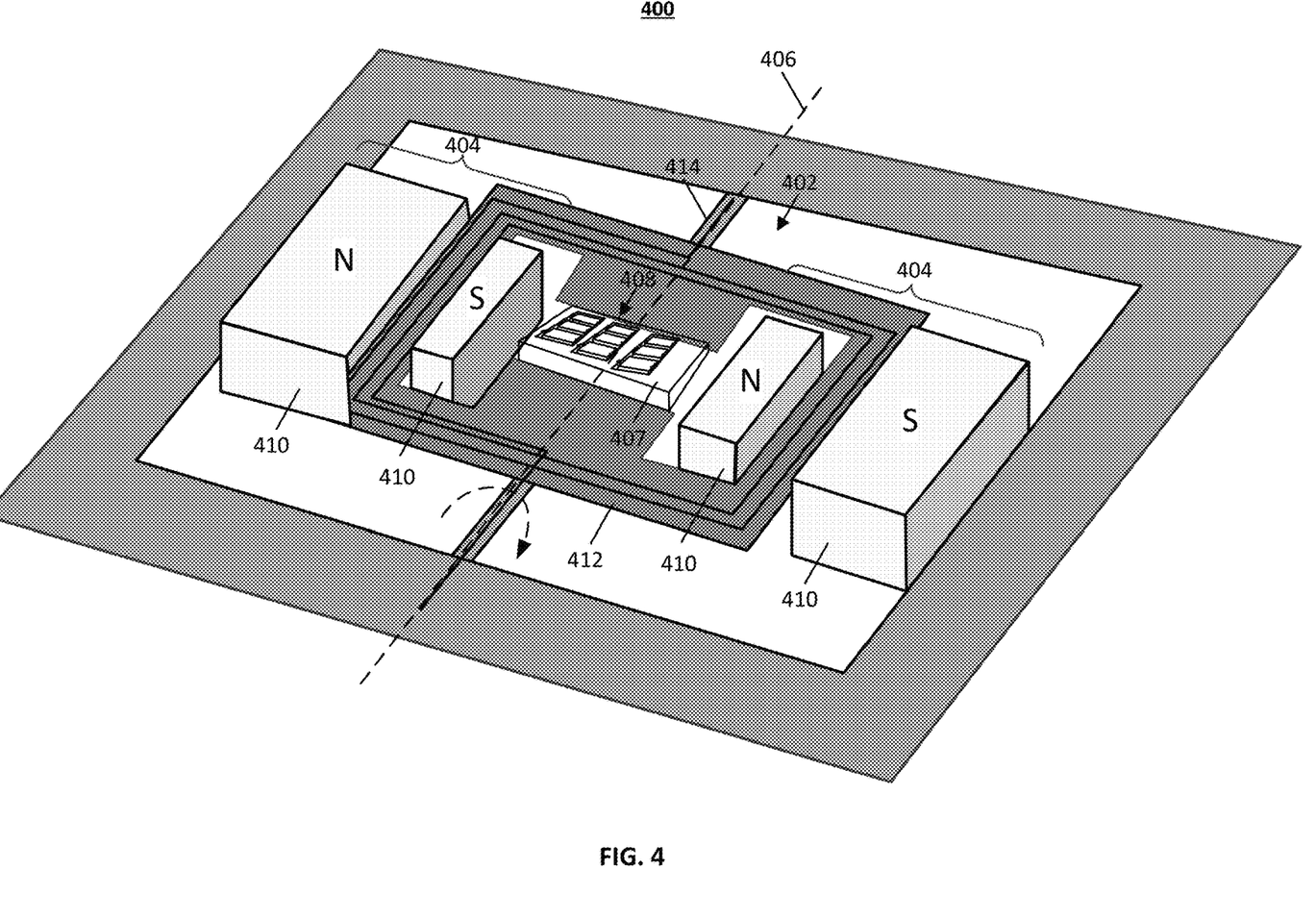
FIG. 4 illustrates a perspective view of an exemplary scanner having a micromachined mirror assembly, according to embodiments of the disclosure.

FIG. 4 illustrates a perspective view of an exemplary scanner 400 having a micromachined mirror assembly 402, according to embodiments of the disclosure. As shown in FIG. 4, scanner 400 may also include an electromagnetic actuator 404, a base 407, and an array of micro mirrors 408 affixed on base 407. In some embodiments, electromagnetic actuator 404 includes a pair of permanent magnets 410 and a tilting plate 412 having electromagnetic coils formed thereon. By controlling the electrical current passing through the electromagnetic coils on tilting plate 412, the magnetic field between permanent magnets 410 and electromagnetic coils can force tilting plate 412 to tilt around a base tilting axis 406 through a pair of hinges 414. Base 407 may be affixed on tilting plate and thus, is configured to tilt around base tilting axis 406 as well driven by electromagnetic actuator 404. Electromagnetic actuator 404 and micromachined mirror assembly 402 may be made by microfabrication processes used by, for example, microelectromechanical system (MEMS). In some embodiments, at least part of micromachined mirror assembly 402, such as electromagnetic actuator 404, is not made by microfabrication processes (e.g., for MEMS) and may be made by traditional manufacturing techniques. In one example, a printed circuit board (PCB) may be used for making tilting plate 412 of electromagnetic actuator 404 so that the electromagnetic coils can be directly embedded in PCB of tilting plate 412. In some embodiments, electromagnetic actuator 404 is configured to drive base 407 of micromachined mirror assembly 402 to tilt at a frequency of between 1 Hz and 100 Hz by applying an alternating current (AC) current with the corresponding frequencies through the electromagnet coils on tilting plate 412. It is understood that although electromagnetic actuator 404 is described as a rotational electromagnetic actuator, in some embodiments, electromagnetic actuator 404 can be any other types of electromagnetic actuators, such as linear drive electromagnetic actuators or cantilever electromagnetic actuators.

Figure 5:
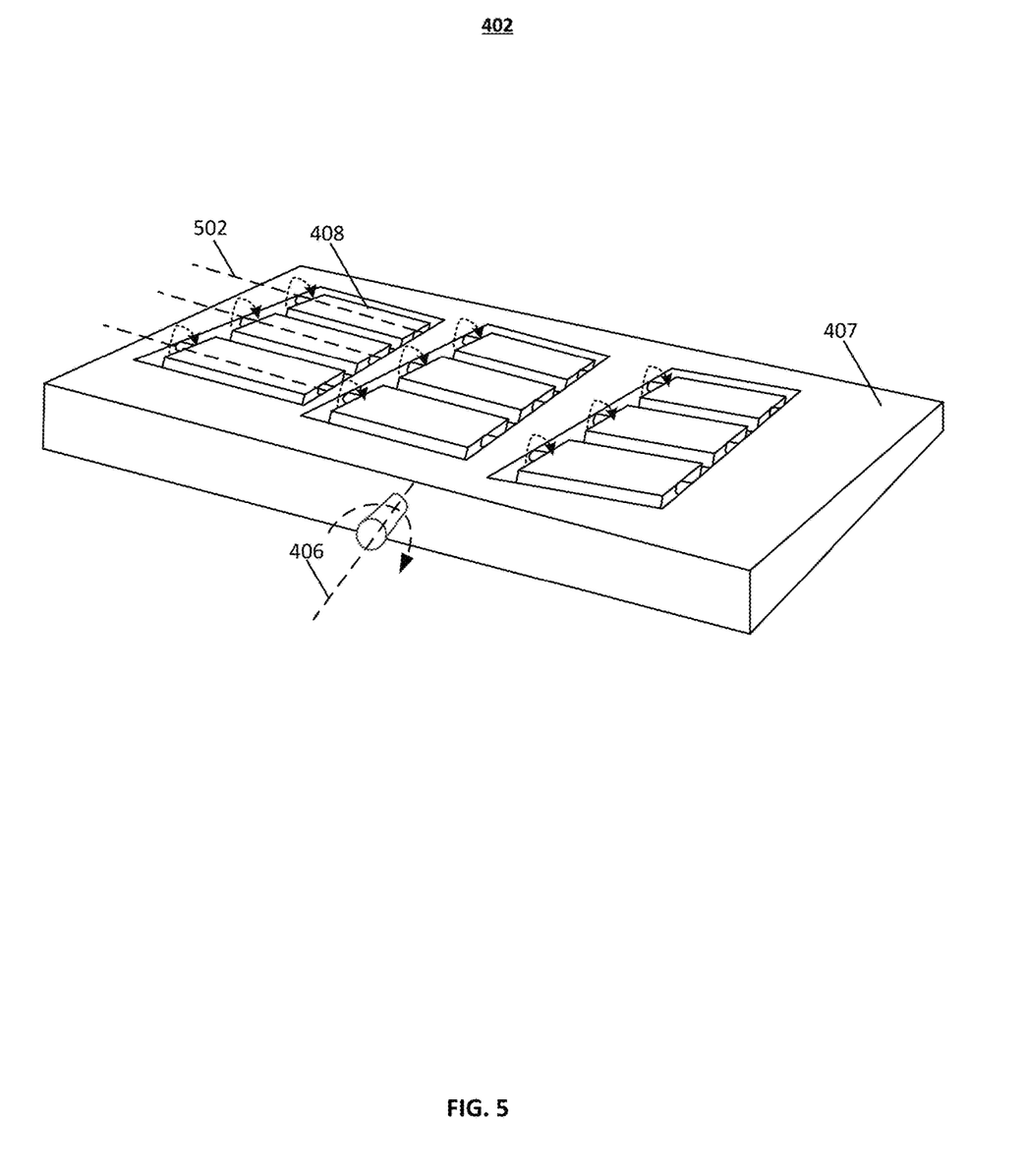
FIG. 5 illustrates a perspective view of an exemplary micromachined mirror assembly having a micro mirror array, according to embodiments of the disclosure.

FIG. 5 illustrates a perspective view of exemplary micromachined mirror assembly 402 having array of micro mirrors 408 affixed on base 407, according to embodiments of the disclosure. Each micro mirror 408 may be identical, e.g., having the same material, dimension, and shape. As shown in FIG. 5, each micro mirror 408 is configured to tilt around a respective mirror tilting axis 502. Each mirror tilting axis 502 is parallel to one another and is orthogonal to base tilting axis 406 around which base 407 tilts, according to some embodiments. As a result, each micro mirror 408 may tilt around its mirror tilting axis 502 in one direction and tilt around the common base tilting axis 406 in another direction as base 407 tilts, such as being driven by electromagnetic actuator 404 shown in FIG. 4. In some embodiments, the actuator is configured to drive each micro mirror 408 of micromachined mirror assembly 402 to tilt at a frequency of between 100 Hz and 100 KHz.

Each micro mirror 408 may tilt around mirror tilting axis 502 as driven by another actuator (not shown) using electrostatic driving or piezoelectric driving. Electrostatic actuators rely on the force between two conducting electrodes when a voltage is applied between them. Depending on the arrangement of the electrodes, various types of electrostatic actuators are possible, such as comb drive electrostatic actuators, parallel plate electrostatic actuators, rotational electrostatic actuators cantilever electrostatic actuators, to name a few. Piezoelectric actuators are electrically controlled positioning elements that function based on the piezoelectric effect. The direct piezo effect, employed for instance in piezoelectric force sensors, represents generating an electric charge as an effect of mechanical strain. Piezoelectric actuators may include, for example, diaphragm piezoelectric actuators or cantilever piezoelectric actuators.

Figure 6A:
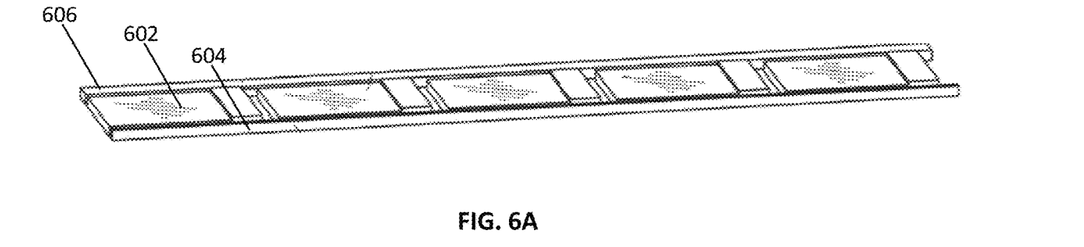
FIGS. 6A-6C illustrate perspective views of an exemplary micro mirror array, according to embodiments of the disclosure.
Figure 6B:
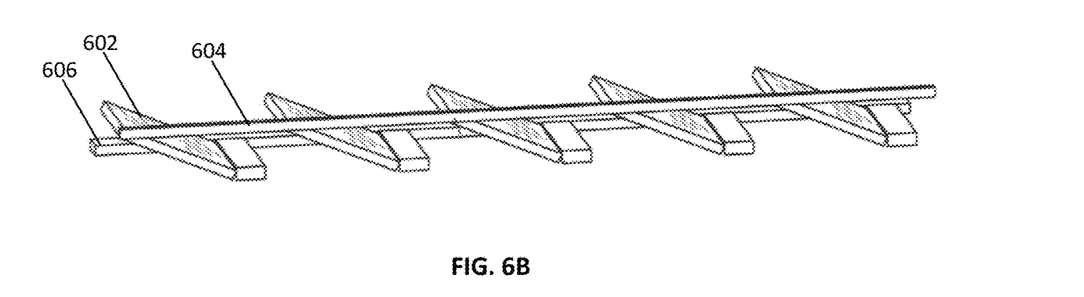
Figure 6C:
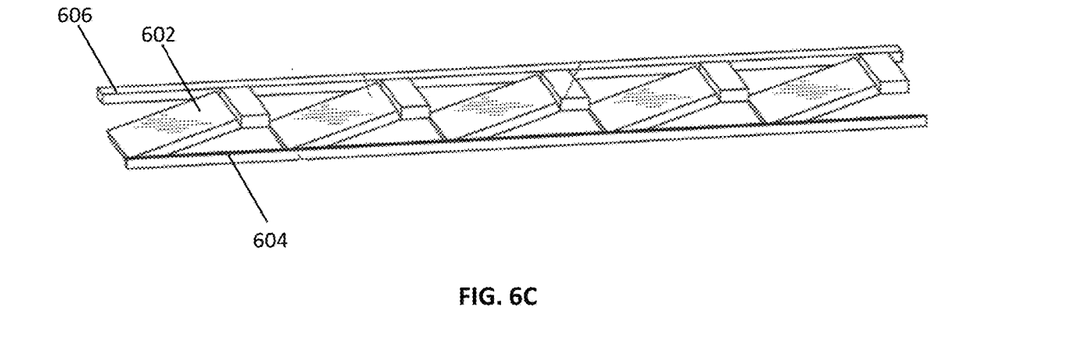

In some embodiments, to ensure that the tilting of each micro mirror 408 around mirror tilting axis 502 is synchronized, array of micro mirrors 408 are mechanically-coupled in one direction. For example, FIGS. 6A-6C show an example of mechanically-coupled array of micro mirrors 602. Array of micro mirrors 602 is mechanically-coupled by a frame having two posts 604 and 606. In FIG. 6A, two posts 604 and 606 are on the same level (initial level), such that all micro mirrors 602 do not tilt. In FIG. 6B, post 606 is at the initial level, and post 604 is raised to an elevated level, such that all micro mirrors 602 tilt to a first angle in a synchronized manner because all micro mirrors 602 are mechanically coupled together. In FIG. 6C, post 604 is at the initial level, and post 606 is raised to an elevated level. Similarly, all micro mirrors 602 tilt to a second angle in a synchronized manner because all micro mirrors 602 are mechanically coupled together. It is understood that although a frame with posts are used for mechanically coupling the micro mirrors in FIGS. 6A-6C, any other suitable mechanical mechanisms can be used as well.

Figure 7:
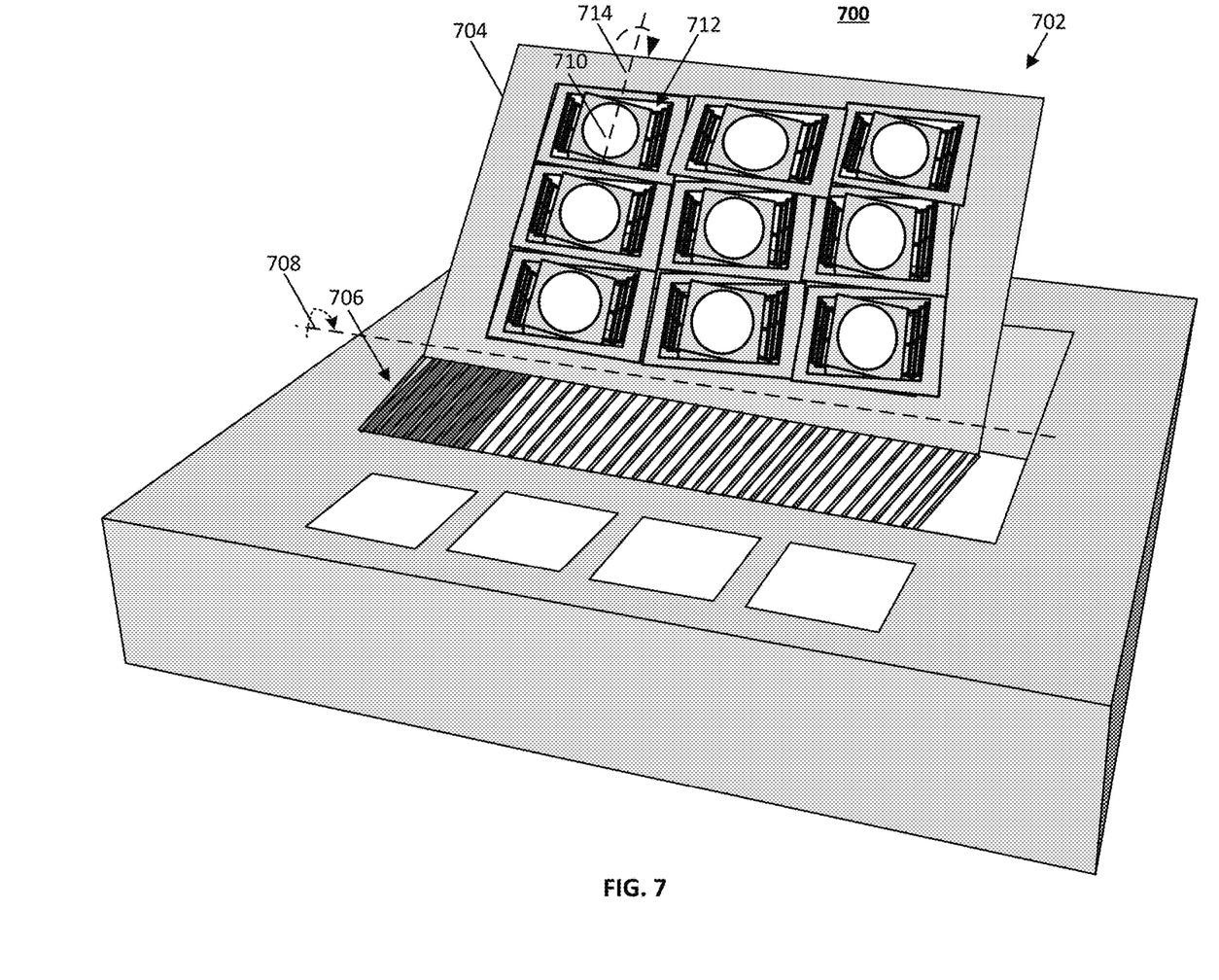
FIG. 7 illustrates a perspective view of another exemplary scanner having a micromachined mirror assembly, according to embodiments of the disclosure.

FIG. 7 illustrates a perspective view of another exemplary scanner 700 having a micromachined mirror assembly 702, according to embodiments of the disclosure. As shown in FIG. 7, scanner 700 may also include a thermal actuator 706, a base 704, and an array of micro mirrors 710 affixed on base 704. Thermal actuator 706 generates motion by thermal expansion amplification. A small amount of thermal expansion of one part of the device translates to a large amount of deflection of the overall device. In some embodiments, thermal actuator 706 is fabricated out of doped silicon as a complex compliant member, and the increase in temperature can be achieved internally by electrical resistive heating or something by a heat source capable of locally introducing heat. As shown in FIG. 7, thermal actuator 706 is a cantilever type bimorph thermal actuator. A bimorph actuator deforms when being heated due to the mismatch in the coefficients of thermal expansion.

In some embodiments, the bimorph structures of thermal actuator 706 serve as the bending flexures of micromachined mirror assembly 702. The bending of the bimorph structures of thermal actuator 706 can cause base 704 of micromachined mirror assembly 702 to tilt around a base tilting axis 708. Base 704 is thus configured to tilt around base tilting axis 708 as driven by thermal actuator 706, according to some embodiments. Thermal actuator 706 and micromachined mirror assembly 702 may be made by microfabrication processes used by, for example, MEMS. In some embodiments, at least part of micromachined mirror assembly 702, such as thermal actuator 706, is not made by microfabrication processes (e.g., for MEMS) and may be made by traditional manufacturing techniques, such as techniques for making PCB. In some embodiments, thermal actuator 706 is configured to drive base 704 of micromachined mirror assembly 702 to tilt at a frequency of between 1 Hz and 100 Hz. It is understood that although thermal actuator 706 is described as a cantilever type bimorph thermal actuator, in some embodiments, electromagnetic actuator 404 can be any other types of electromagnetic actuators, such as diaphragm type bimorph thermal actuators, pneumatic type thermal actuators, thermal expansion type thermal actuators, or shape memory alloy (SMA) type thermal actuators.

As shown in FIG. 7, each micro mirror 710 is configured to tilt around a respective mirror tilting axis 714 as driven by an actuator 712 (e.g., an electrostatic actuator or a piezoelectric actuator). Each mirror tilting axis 714 is parallel to one another and is orthogonal to base tilting axis 708 around which base 704 tilts, according to some embodiments. As a result, each micro mirror 710 may tilt around its mirror tilting axis 714 in one direction and tilt around the common base tilting axis 708 in another direction as base 704 tilts, such as being driven by thermal actuator 706 shown in FIG. 4. In some embodiments, actuator 712 is configured to drive each micro mirror 710 of micromachined mirror assembly 702 to tilt at a frequency of between 100 Hz and 100 KHz.

Figure 8:
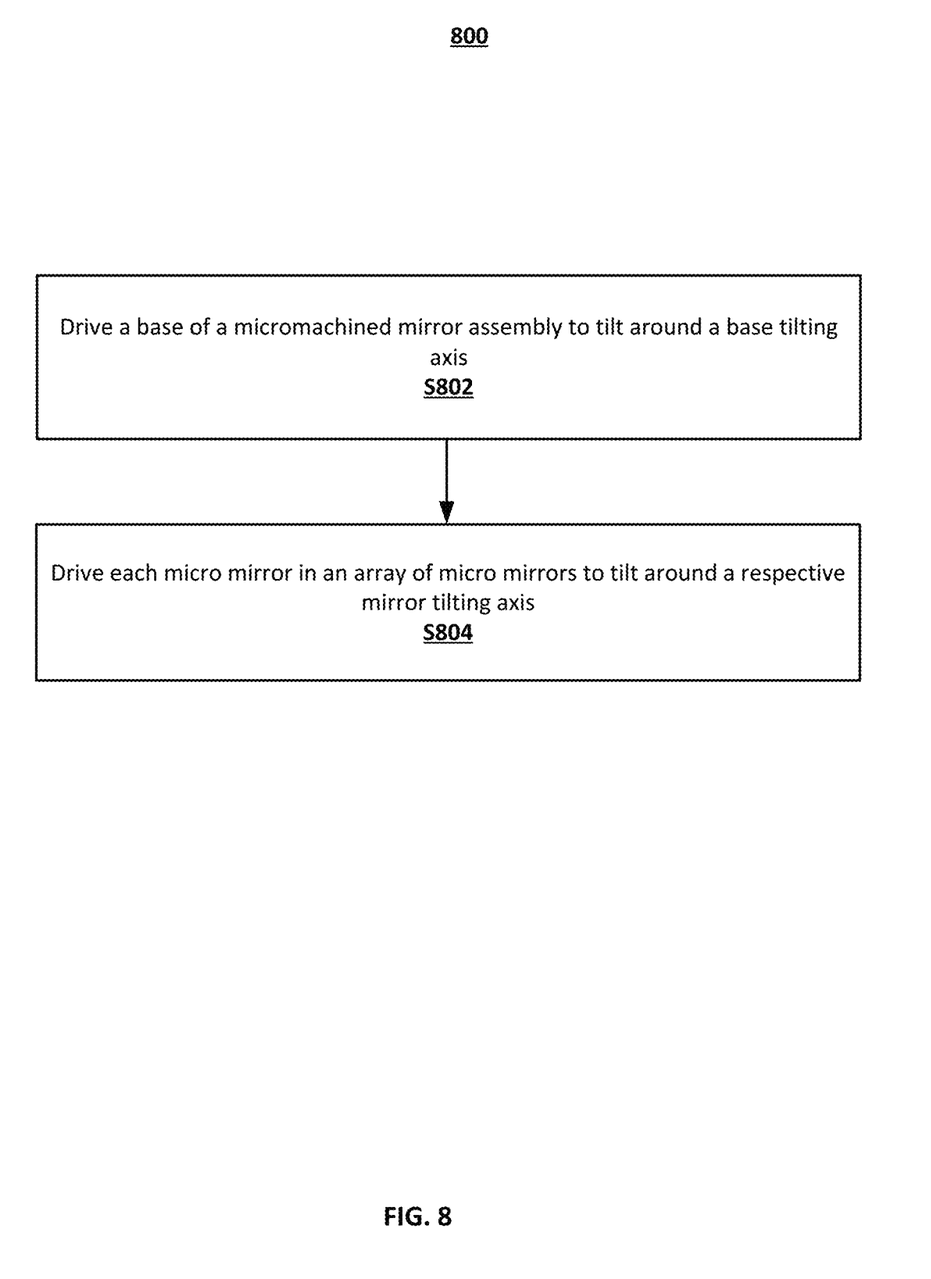
FIG. 8 illustrates a flow chart of an exemplary method for driving a micromachined mirror assembly, according to embodiments of the disclosure.

FIG. 8 illustrates a flow chart of an exemplary method 800 for driving a micromachined mirror assembly including an array of micro mirrors mechanically coupled to one another and affixed on the base. For example, method 800 may be used to drive micromachined mirror assemblies 300, 402, and 702 in FIGS. 3-5 and FIG. 7. However, method 800 is not limited to that exemplary embodiment. Method 800 may include steps S802-S804 as described below. It is to be appreciated that the steps may be performed simultaneously, or in a different order than shown in FIG. 8.

In step S802, the base is driven to tilt around a base tilting axis. In some embodiments, the base is driven by a first actuator including an electrostatic actuator or a piezoelectric actuator driven by electrostatic forces or piezoelectric forces, respectively. The frequency at which the base tilts around the base tilting axis is between 1 Hz and 100 Hz, according to some embodiments. In some embodiments, controller 310 may send a driving signal to first actuator 306 indicative of driving parameters, such as the frequency and amplitude of an AC current. Based on the driving signal, first actuator 306 may drive base 302 to tilt at the corresponding frequency around the base tilting axis. As array of micro mirrors 304 are affixed on base 302, the tilting of base 302 also causes the tilting of each micro mirror 304 at the same frequency around the base tilting axis.

In step S804, each micro mirror in the array of micro mirrors is driven to tilt around a respective mirror tilting axis. Each of the mirror tilting axes is parallel to one another and is nonparallel to the base tilting axis, according to some embodiments. The tilting of each micro mirror in the array of micro mirrors around the respective mirror tilting axis may be synchronized as the micro mirrors are mechanically coupled to one another. In some embodiments, each micro mirror is driven by a second actuator including an electromagnetic actuator or a thermal actuator driven by electromagnetic forces or thermal forces, respectively. The frequency at which the micro mirror tilts around the mirror tilting axis is between 100 Hz and 100 KHz, according to some embodiments. In some embodiments, controller 310 may send a driving signal to second actuator 308 indicative of driving parameters, such as the frequency and amplitude of an AC current. Based on the driving signal, second actuator 308 may drive each micro mirror 304 to tilt at the corresponding frequency around the mirror tilting axis. As array of micro mirrors 304 are mechanically coupled, the tilting of each micro mirror 304 is synchronized. It is understood that the tilting around the base tilting axis and the tilting around the mirror tilting axis may be independent from one another and may occur simultaneously.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A scanning mirror assembly of an optical sensing system, comprising:
   a frame comprising:
      a first post and a second post arranged in parallel and separated by a gap; and
      a set of beams coupled perpendicularly to the first post and positioned in the gap between the first post and the second post; and
   an array of micro mirrors coupled to the frame, wherein the array of micro mirrors tilt in a synchronized manner around a mirror tilting axis when the first post and the second post are positioned in different vertical planes.

2. The scanning mirror assembly of claim 1, wherein a first end of the array of micro mirrors are coupled to the set of beams.

3. The scanning mirror assembly of claim 2, wherein:
   the array of micro mirrors tilt around the mirror tilting axis in a first direction when the first post is elevated above the second post.

4. The scanning mirror assembly of claim 3, wherein:
   the array of micro mirrors tilt around the mirror tilting axis in a second direction opposite to the first direction when the second post is elevated above the first post.

5. The scanning mirror assembly of claim 2, wherein:
   a second end of the array of micro mirrors is coupled to the second post, and
   the second end is opposite the first end.

6. The scanning mirror assembly of claim 5, wherein the second end of the array of micro mirrors is coupled to the second post at a single point of attachment.

7. The scanning mirror assembly of claim 6, wherein the single point of attachment is located on a side surface of the array of micro mirrors parallel to the second post.

8. A scanner of an optical sensing system, comprising:
   a scanning mirror assembly comprising:
      a frame comprising:
         a first post and a second post arranged in parallel and separated by a gap; and
         a set of beams coupled perpendicularly to the first post and positioned in the gap between the first post and the second post; and
      an array of micro mirrors coupled to the frame wherein the array of micro mirrors tilt in a synchronized manner around a mirror tilting axis when the first post and the second post are positioned in different vertical planes; and
   a first driver configured to drive the array of micro mirrors to tilt in the synchronized manner around the mirror tilting axis by causing the second post to be raised and lowered.

9. The scanner of claim 8, wherein a first end of the array of micro mirrors are coupled to the set of beams.

10. The scanner of claim 9, wherein the array of micro mirrors tilt around the mirror tilting axis in a first direction when the first post is elevated above the second post.

11. The scanner of claim 10, wherein
   the array of micro mirrors tilt around the mirror tilting axis in a second direction opposite to the first direction when the second post is elevated above the first post.

12. The scanner of claim 9, wherein:
a second end of the array of micro mirrors is coupled to the second post, and
the second end is opposite the first end.

13. The scanner of claim 12, wherein the second end of the array of micro mirrors is coupled to the second post at a single point of attachment.

14. The scanner of claim 13, wherein the single point of attachment is located on a side of the array of micro mirrors parallel to the second post.

15. The scanner of claim 9, wherein:
the scanning mirror assembly further comprises a base, and
the array of micro mirrors are affixed to the base.

16. The scanner of claim 15, wherein the scanning mirror assembly further comprises a second driver configured to drive the base to tilt around a base tilting axis.

17. The scanner of claim 16, wherein the base tilting axis is perpendicular to the mirror tilting axis.

18. The scanner of claim 16, wherein the array of micro mirrors are configured to additionally tilt around the base tilting axis as the base tilts.

19. The scanner of claim 16, wherein:
the array of micro mirrors are configured to tilt around the mirror tilting axis at a first frequency, and
the base is configured to tilt around the base tilting axis at a second frequency less than the first frequency.

20. A transmitter of an optical sensing system, comprising:
a light source configured to emit a laser beam; and
a scanner configured to steer the laser beam towards an object, wherein the scanner comprises:
a scanning mirror assembly comprising:
a frame comprising:
a first post and a second post arranged in parallel and separated by a gap; and
a set of beams coupled perpendicularly to the first post and positioned in the gap between the first post and the second post; and
an array of micro mirrors coupled to the frame wherein the array of micro mirrors tilt in a synchronized manner around a mirror tilting axis when the first post and the second post are positioned in different vertical planes.

* * * * *